United States Patent
Edele et al.

[11] Patent Number: 5,628,085
[45] Date of Patent: May 13, 1997

[54] CONNECTION PIECE FOR A WINDSHIELD WIPER SYSTEM OF A VEHICLE

[75] Inventors: Reinhard Edele; Oldrich Krizek, both of Bietigheim-Bissingen; Eckhardt Schmid, Brackenheim, all of Germany

[73] Assignee: ITT Automotive Europe GmbH, Germany

[21] Appl. No.: 575,319

[22] Filed: Dec. 20, 1995

[30] Foreign Application Priority Data

Dec. 20, 1994 [DE] Germany .................. 44 45 414.7

[51] Int. Cl.⁶ .................................................. B60S 1/40
[52] U.S. Cl. ........................ 15/250.32; 15/250.31; 15/250.351
[58] Field of Search .................. 15/250.32, 250.46, 15/250.31, 250.33, 250.23, 250.351, 250.44; 403/323

[56] References Cited

U.S. PATENT DOCUMENTS

| | | | |
|---|---|---|---|
| 3,908,244 | 9/1975 | Ursel | 15/250.32 |
| 4,308,635 | 1/1982 | Maiocco | 15/250.32 |
| 4,949,422 | 8/1990 | Bauer et al. | 15/250.32 |
| 4,951,343 | 8/1990 | Scorsiroli | 15/250.32 |

FOREIGN PATENT DOCUMENTS

| | | | |
|---|---|---|---|
| 1251670 | 10/1967 | Germany | 15/250.32 |
| 2503373 | 7/1976 | Germany | 15/250.32 |
| 3423416 | 3/1985 | Germany . | |
| 4224866 | 3/1994 | Germany . | |
| 8500328 | 1/1985 | WIPO | 15/250.32 |

*Primary Examiner*—Gary K. Graham
*Attorney, Agent, or Firm*—J. Gordon Lewis; Thomas N. Twomey

[57] ABSTRACT

In order to provide the possibility of simplifying the varieties with relation to the type of wiper blades, the invention is directed toward developing a cost-effective and easy to handle connection piece for connecting a link cap at its wiper rod with aligning borings in its wiper rod comprising parallel side walls with the carrier shaft of a wiper blade, which comprises in a fastening section, which is open at its top, a fastening bolt between its parallel side cheeks. The connection piece comprises an upper connection part for a fixed connection with the link cap of the wiper arm and the bottom part for connecting the carrier shaft of the wiper blade with the fastening section of the carrier shaft in a locking and oscillating manner.

10 Claims, 2 Drawing Sheets

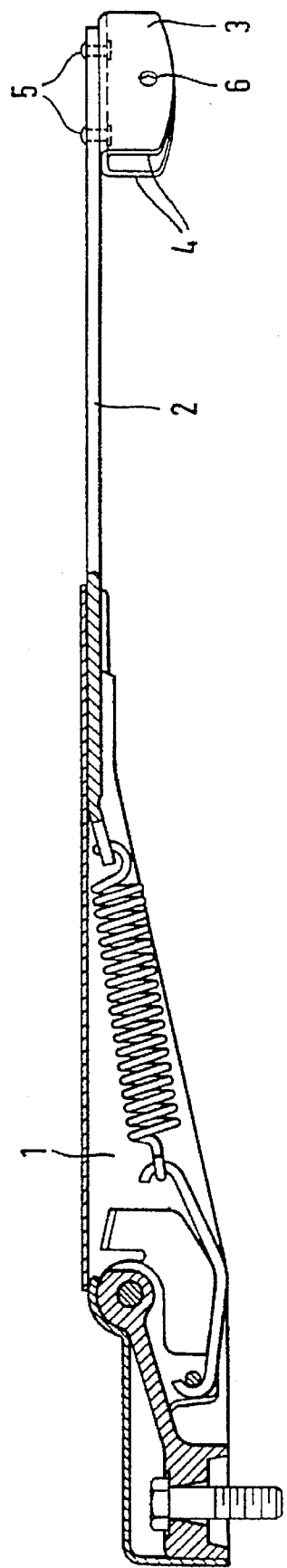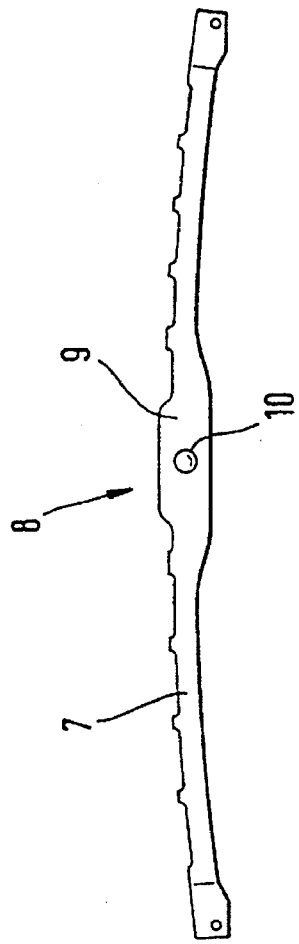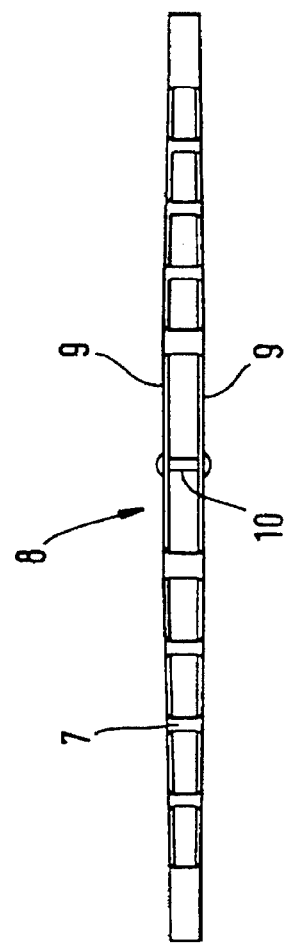
Fig. 1
Fig. 2
Fig. 3

CONNECTION PIECE FOR A WINDSHIELD WIPER SYSTEM OF A VEHICLE

TECHNICAL FIELD

The invention relates to a connection piece for a windshield wiper system of a vehicle for connecting the carrier rod of a wiper blade with a wiper arm.

BACKGROUND OF THE INVENTION

In the practice, in particular in commercial vehicles, windshield wiper systems, which comprise a wiper arm with a wiper rod to the free end of which a so-called link cap for the oscillating connection with the carrier shaft or carrier yoke of a wiper blade is fastened have been used for some time, the link cap mostly being a bent sheet metal with an essentially U-shaped cross-section. Two side walls extend from a back into the direction of the windshield to be cleaned, and in the side walls there are aligning borings. The carrier shaft of the wiper blade to be connected with the wiper arm also has a U-shaped cross-section with a closed back and two parallel side cheeks projecting from the back into the direction of the windshield to be cleaned. In the side cheeks of the carrier shaft there are also borings aligning with one another. When mounted, the link cap engages into the carrier shaft of the wiper blade from the top in such a manner that the aligning borings of the link cap and the carrier shaft are arranged coaxially.

A pivot shaft is guided through the borings and secured axially. For axial securing, the pivot shaft comprises at one end a screw head and at the opposite end a thread, onto which a matching fastening nut is screwed. It has been shown to be advantageous that a relatively thin plastic part with a likewise U-shaped cross-section is arranged between the carrier shaft and the link cap and is used for minimizing a lateral play between the Carrier shaft and the link cap.

A disadvantage of this known connection is that the pivot shaft consists of heat treated steel to avoid early wear and that a wiper blade with an especially designed carrier shaft is necessary for coupling to the link cap.

A wiper arm of the type described at the beginning is also known from DE 34 23 416 A1. In this case, the link cap additionally has between its side walls a rip projecting downward from the back which is supported above the pivot shaft on the back of the carrier shaft. This rip lies between two projections extending upward from the carrier shaft back.

A further disadvantage of the two described solutions is that for changing the wiper blade the screw connection of the pivot shaft must be disconnected and then reconnected. This handling is quite complicated and requires the use of tools. Furthermore, it is not possible to connect a wiper blade of the otherwise common type, in which the carrier shaft has a fastening bolt in its connecting section, which is open at the top, between the parallel side cheeks with the link cap wiper arm. Therefore a number of styles of wiper blades.

An object of the invention is to develop a cost-effective connection piece which can be handled easily and which provides the possibility for simplifying the varieties with relation to types of wiper blades.

The advantage of the present invention is that, when using the connection piece of the invention, existing windshield wiper systems can be completed with a link cap wiper arm without any change with a wiper blade of the general type, i.e. with a fastening bolt between the parallel side cheeks of the carrier shaft, which is open in this area.

Because this connection piece, as it is generally done today, can be manufactured as a one-piece plastics part, this is particularly cost-effective.

The connection piece of the invention is preferably inserted with its upper connection part between the side walls of the link cap with a positive fit and fastened to the link cap by a screw projecting through the aligning borings in the side walls of the link cap and the hole through in its upper fastening part and axially secured by a nut. Because this fastening screw is not subject to any bearing movements, it can be made of cost-effective material which is not heat treated. Placing a thin plastic form part between the link cap and the upper fastening part of the connection piece is not necessary.

Because the bottom fastening part of the connection piece is provided with an easy to handle locking connection for locking onto the fastening bolt of the carrier shaft, the connection piece can be fastened to the link cap for a very long time. Changing the connection piece is only necessary after very frequent wiper blade change, when because of certain wear and tear a secure locking of the carrier shaft onto the connection piece is no longer guaranteed or, because of a too large lateral play between the side walls of the bottom fastening part and the side cheeks of the carrier shaft, a sufficient lateral guide of the wiper blade is no longer guaranteed. Exchanging the wiper blade is extremely easy and can be carried out without the help of additional tools. The wiper blade can be disconnected from the connection piece by merely applying corresponding force. In the same manner, the new wiper blade is connected with the connection piece in the opposite direction by the same force. For this, the carrier shaft of the wiper blade is placed on the bottom connection part of the connection piece from the bottom until the side walls of the bottom connection part reach between the side cheeks of the carrier shaft and, furthermore, the fastening bolt reaches into the stop notch, which is open at the bottom. With corresponding force, the carrier shaft is moved further into the direction of the link cap until it takes its final position in the stop notch and the same locks in at the circumference of the fastening bolt.

The connection piece or its upper connection part is preferably only as large as is absolutely necessary for a secure and form-stable connection with the link cap of the wiper arm. By pulling the exterior surfaces of the upper connection inwardly, the connection between the upper connection part of the connection piece and the link cap can be designed even more secure. Simultaneously, it provides for a harmonious exterior, which also has a positive effect on the wind flow conditions with regard to the wiper unit.

When, according to another advantageous formation the upper connection part is essentially hollow and is formed by corresponding outer walls as well as partitioning walls or stabilizing walls, material is saved, which has a favorable effect on the costs for the manufacture of the connection piece.

For a simple, but secure connection of the wiper blade with the connection piece, which furthermore guarantees the corresponding oscillation of the wiper blade with regard to the wiper arm or the connection piece, a stop notch, which is open at the bottom, for the fastening bolt of the carrier shaft is formed by two stop springs, which are arranged between the side walls of the bottom connection part and extend downward starting from a partitioning wall. Furthermore, in the area of the stop notch formed into the stop springs there are recesses, which are open downward at their edges in the side walls of the bottom connection part.

When, furthermore, the upper edges of the recesses in the side walls are formed in such a manner that they at least at certain sections lie on the fastening bolt of the carrier shaft, the stability of the lock connection is improved even more. The danger that the fastening bolt of the carrier shaft may tilt during the opposite wiper movements in the lock connection is reduced more by this measure.

According to a further embodiment, the stop notch of the bottom connection part and the hole through of the upper connection part are arranged in a common plane, preferably in the vertical transverse center plane of the connection piece, therefore the conditions for the transfer of force from the wiper arm into the connection piece on the carrier shaft of the wiper blade are favorable. Furthermore, this measure is a basis for the generation of a symmetry of the connection piece, which is further cost-effective for the manufacture of the connection piece. This advantage is even more intensified when the connection piece is also symmetrical with relation to its vertical longitudinal center plane.

A further advantage is a formation according to which between the side walls of the bottom connection part stabilizing walls are arranged. This means that the bottom connection part is also essentially hollow; therefore, the connection piece can be manufactured with a minimum of material expenditure.

To guarantee a good lateral guide of the carrier shaft at the side walls of the bottom connection part and, therefore, balance a default play between the side walls of the bottom connection part and the side cheeks of the carrier shaft, it is recommended to provide the side walls of the bottom connection part with laterally projecting guide beads or with laterally projecting elastic sections.

BRIEF DESCRIPTION OF THE DRAWINGS

FIG. 1 is a wiper arm in a partially cut representation with the link cap.

FIG. 2 is a side view of a carrier shaft of a wiper blade.

FIG. 3 is an upper view of the carrier shaft of FIG. 2.

DETAILED DESCRIPTION OF THE PREFERRED EMBODIMENTS

Figure 6:
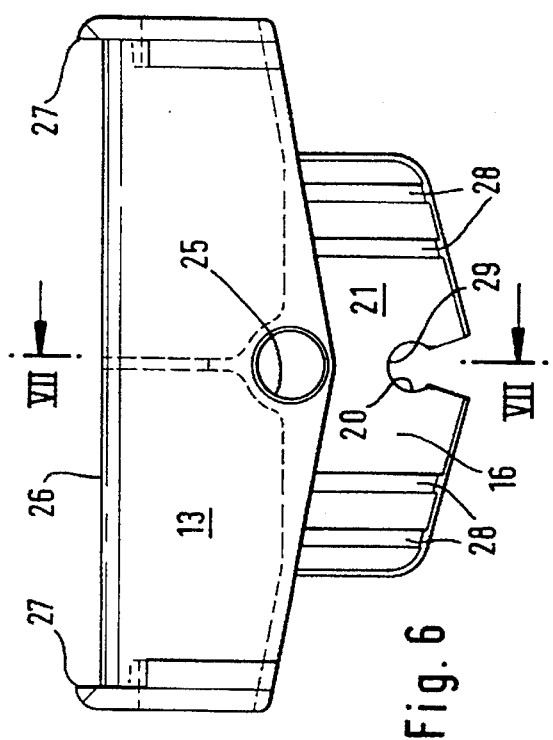
FIG. 6 is a side view of the connection piece according to the invention.

FIG. 1 shows a wiper arm 1, which, in principle, is constructed in a known manner and, therefore, needs no further detailed description. This wiper arm 1 is provided with a straight wiper rod 2, at the free end of which a link cap 3 is fastened. This link cap 3 is made of sheet metal and essentially has a U-shaped cross-section, from one back part two parallel side walls 4 going downward, i.e. in the direction of the windshield to be wiped. At the wiper rod 2, the link cap 3 is fastened by means of two rivets 5 which project through the back of the link cap 3 and the wiper rod 2. In the side wall 4 of the link cap (lying in the front in FIG. 2) another boring 6 can be seen. The rear partially covered side wall 4 of the link cap 3 also carries a boring, aligning with the boring 6 in the front side wall 4. The connection piece of the invention has to be fastened at this link cap 3, which will be described in more detail later.

In FIGS. 2 and 3, the carrier shaft 7 of a generally used type of a wiper blade is represented, which, in the direction of the windshield to be wiped, is connected in an oscillating manner with the connection piece of the invention. At the carrier shaft 7 a fastening section 8 is designed, in the area of which the back of a carrier shaft 7 is opened. In other words, the fastening section 8 is formed by parallel sections of the side cheeks 9 of the carrier shaft, between which transverse to the longitudinal direction of the carrier shaft 7 a fastening bolt 10 is attached. The fastening bolt 10 is arranged in a general manner in the aligning borings in the side cheeks 9 of the carrier shaft 7 and fastened with rivets at the exterior sides of the side cheeks 9. At both opposite ends of the carrier shaft 7, shafts which are arranged below or spike shafts are coupled, which form together with the carrier shaft 7 a carrier shaft system, which accepts and guides the robber-elastic wiper rib.

In FIGS. 4 to 7, the connection piece of the invention is represented, which is used for connecting the carrier shaft 7 represented in FIGS. 2 and 3 with the wiper arm 1 represented in FIG. 1. It is shown in FIGS. 4 to 7, that the connection piece is constructed symmetrically, namely in relation to its vertical transverse center plane 11 and also to its vertical longitudinal center plane 12.

Figure 4:
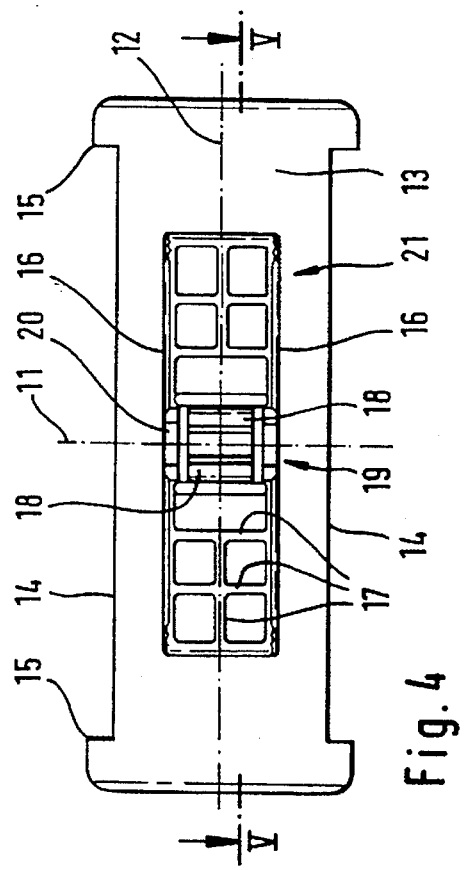
FIG. 4 is a connection piece according to the invention in a view from the bottom.

It is shown in FIG. 4, that the long exterior sides of the upper connection piece 13 are pulled in near their opposite ends, thus forming an indentation 14. These indentations 14 are formed in such a manner that they can receive the side walls 4 of the link cap 3 completely.

The side walls 4 of the link cap 3 completely fill the indentations 14 and end even with the projecting edges 15. Furthermore, it is seen in FIG. 4, that the bottom connection part 21 is essentially formed as a hollow housing, which is open at the bottom, with the two parallel side walls 16. Several transverse and longitudinal stabilizing walls 17 extend between the side walls 16. Furthermore, the stop springs 18 arranged between the side walls 16 are represented, which form the stop notch 19, which is open at the bottom. In the area of the stop notch 19, which runs in transverse direction to the connection piece, correspondingly large recesses 20 which are edge-open at the bottom, are attached to the side walls 16.

Figure 5:
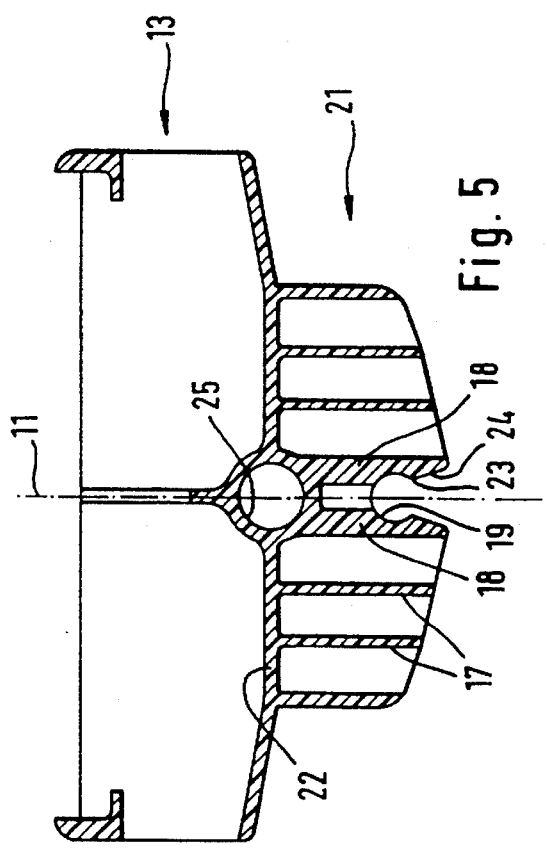
FIG. 5 is a section along line V—V in FIG. 4.

It is seen in FIG. 5 that in the bottom area of the upper connection part 13 a partitioning wall 22 essentially running in a horizontal plane is arranged, from which the stabilizing walls 17 and the 2 parallel spring tongues 18 extend downward. The stop notch 19 formed into the spring tongues essentially consists of a part with a round cross-section, which is open at the bottom, thus forming the stop shoulders 23 and the stopping inclinations 24. The diameter of the round part is adjusted to the diameter of the fastening bolt 10 of the carrier shaft 7, so that the fastening bolt 10 can be pivoted in the stop notch 19 and is thus secured by the stop shoulders. The stop notch 19 is arranged in the center of the vertical transverse center plane 11. Above the stop notch 19 on the vertical transverse center plane 11 a hole through 25 running transverse through the upper connection part 13 is seen with circle cross-section. In this area, the partitioning wall 22 is formed as a tube, thus surrounding the hole through 25.

It is seen in FIG. 6 that the back 26 of the upper connection part 13, analogously to the longitudinal sides of the upper connection part, is also arranged in a recessed manner close to the right and left sides in FIG. 6. This saddle-like indentation is again meant for receiving the back of the link cap 3 completely, so that the exterior sides of the back of the link cap 3 end evenly with the left or fight edge 27 of the upper fastening part 13 projecting upward. With relation to the bottom connection part 21 of the connection piece it is seen in FIG. 6 that the side walls 16, of which only one is visible, comprise guide ribs 28 or elastic sections running vertically and projecting laterally from the side walls 16. Furthermore, it is seen that the form of the recess 20, which is open at the bottom, is essentially adjusted in the side walls to the form of the stop notch 19 (FIG. 5), the upper edge 29 of the recesses 20 being designed and positioned in such a manner that it lies close to the fastening bolt 10 of the carrier shaft 7 at its circumference, when the fastening bolt 10 is properly arranged in the stop notch 19.

Figure 7:
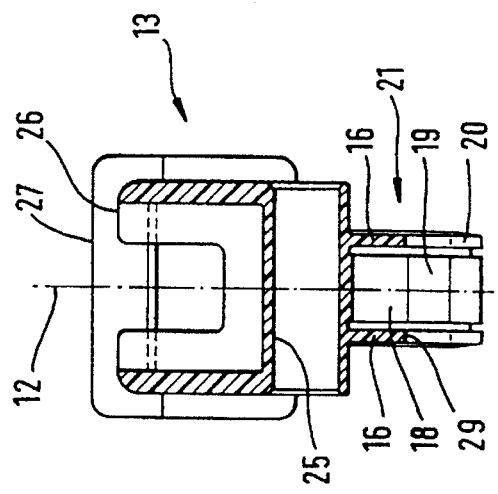
FIG. 7 is a section along line VII—VII of FIG. 6.

FIG. 7 essentially shows that the stop springs 18 extend from the partitioning wall 22 (FIG. 5) starting between the side walls 16 of the bottom connection part 27 downward, not connected with the side walls 16 to guarantee that they can be perfectly elastically coupled. Furthermore, it is seen that the upper connection part 13 is essentially hollow and that there is a sufficient hole in its upper area for receiving the rivet heads of rivet 5 (FIG. 1), which are used for fastening the link cap 3 to the wiper rod 2. The vertical longitudinal center plane 12 represents a symmetrical plane in FIG. 7.

The connection piece represented in FIGS. 4 to 7 is made as a form part by injection molding of a form-stable plastic material, thus guaranteeing that spring tongues 18, which are only connected with the partitioning wall 22 at one end, which form the stop notch 19, can be elastically coupled.

To make a connection oscillating about the axis of the fastening bolt 10 of the carrier shaft 7 between a wiper blade and a wiper arm 1 with a link cap 3 at its fastening rod 2, the connection piece is first inserted with its upper connection part 13 from the bottom between the side walls 4 of the link cap 3. By the recesses 14 at the parallel longitudinal sides of the connection piece and the recessed back 26 an even connection between the link cap 3 and the upper connection part 13 is made. This form closure is designed in such a manner that the borings 6 in the side walls 4 of the link cap 3 are simultaneously arranged in an aligned manner with the hole through 25 of the upper connection part of the connection piece. Then, the form closure connection obtained by means of a standard screw with nut through the borings 6 and the hole through 26 can be fixed. Because the connection piece is designed in such a manner that it can sustain a variety of wiper blade changes without loosing its workability, it is also possible to fix the connection piece by a rivet bolt at the link cap 3.

Then, the connection between the connection piece and the wiper blade must be made. For this, the wiper blade is locked with its carrier shaft 7 from the bottom onto the bottom connection part 21 of the connection piece, the parallel side walls 16 of the bottom connecting part 21 reaching between the side cheeks 9 of the carrier shaft 7 in its connecting section 8. The fastening bolt 10 of the carrier shaft 7 is moved into the stop notch 19 or the recesses 20, which are edge-open at the bottom, into the side walls 16, the stopping inclinations 24 of the stop springs 18 sliding at the circumference of the fastening bolt 10, thus expanding the stop springs 18 elastically. Having overcome the stop shoulders 23, the spring tongues 18 pull back until the stop notch 19 lies close at the circumference of the fastening bolt 10 with its part which is round in the diameter, the stop shoulders 23 holding the fastening bolt 10, thus the carrier shaft 7 at the connection piece. In this position, in which the fastening bolt 10 is completely accepted by the stop notch 19, the upper edges 29 of the recesses 20 in the side walls 16 further lie on the circumference of the fastening bolt and support the same with a distance as far as possible apart from one another. Thus, the danger of tilting of the connection piece with regard to the fastening bolt 10 transverse to the vertical longitudinal center plane 12 is minimized. The fastening bolt 10 is positioned in the stop notch 19 and the recesses 20 of the side walls 16 in such a manner that it is pivoted around its axis relatively with regard to the connection piece, at least by the angle area for the necessary oscillating of the wiper blade with relation to the wiper arm 1.

After the connection between the carrier shaft 7 and the bottom connection part 21 has been made, the side walls 16 lie close with the guide ribs 28 or elastic sections to the interior sides of the side cheeks 9 of the carrier shaft 7 in its connecting section 8. By the guide ribs 28 or the elastic sections a possible tolerance based lateral play is balanced between the side walls 16 and the side cheeks 8 and a perfect lateral guide of the wiper blade carrier shaft at the connection piece is guaranteed. This lateral guide is necessary to prevent during the operation of the windshield wiper a tilting of the wiper blade with regard to its longitudinal axis. Such a tilting would deteriorate the wiper quality substantially.

When a worn wiper blade is exchanged against a new one, the connection between the carrier shaft 7 and the connection piece is simply removed by merely pulling the wiper blade carrier shaft down from the bottom connection piece 21 with the necessary force. The spring tongues 18 are again extended automatically, until the fastening bolt 10 has overcome the stop shoulders 23 and has been removed from the stop notch 19. The use of tools is not necessary.

15 edge
16 side wall
17 stabilizing wall
18 stop spring
19 stop notch
20 recess
21 bottom connection piece
22 partitioning wall
23 stop shoulder
24 stopping inclination
25 hole through
26 back
27 edge
28 guide bead
29 upper edge

We claim:

1. A windshield wiper system for wiping a windshield, said system comprising:

a wiper arm, said wiper arm including an elongated wiper rod which has an end section defining a free end thereof, an elongated link cap fastened to said end section, said link cap has a U-shaped transverse cross-section defining two parallel side walls with a back therebetween, each side wall with a bore therethrough, said bores being in axial alignment;

a wiper blade, said wiper blade including an elongated carrier yoke with an intermediate fastening section, said fastening section of said yoke includes a pair of spaced parallel side cheeks with a fastening bolt transversely extending between and to said cheeks;

an elongated connection piece for connecting the end section with the carrier yoke, said connection piece includes an upper connection part defining a top and a bottom connection part defining a bottom, said upper connection part has a transverse hole therethrough and is received between the parallel side walls of the link cap and attached thereto by a fastening bolt passing through the bores and the hole, said bottom connection part has two parallel side walls, between which a transversely extending stop notch is formed, said notch is open at the bottom, said parallel walls of said bottom connection part are received between the parallel side cheeks of the carrier yoke with the stop notch receiving the fastening bolt of the carrier yoke therein for pivotal movement.

2. A wiper system according to claim 1, wherein the upper connection part is formed in such a manner that it can be grasped by the link cap from the top and received at least almost completely by an area described by exterior edges of the link cap.

3. A wiper system according to claim 1, wherein the upper connection part is hollow and formed by corresponding exterior walls and partitioning walls.

4. A wiper system according to claim 1, wherein between the side walls of the bottom connection part starting from a partitioning wall, two stop springs extend downward, in which the stop notch, which is open at the bottom, is formed in for the fastening bolt of the carrier yoke, and that the side walls comprise recesses, which are edge-open at the bottom, in the area of the stop notch.

5. A wiper system according to claim 4, wherein upper edges of the recesses are formed in the side walls such that they are close to the fastening bolt of the carrier yoke.

6. A wiper system according to claim 1, wherein the stop notch of the bottom connection part and the hole through the upper connection part are provided at a distance from one another in a common plane, preferably in a vertical transverse center plane of the connection piece.

7. A wiper system according to claim 1, wherein the side walls of the bottom connection part comprise guide ribs projecting outwardly therefrom for engaging said side cheeks.

8. A wiper system according to claim 1, wherein stabilizing walls interconnect the side walls of the bottom connecting part.

9. A wiper system according to claim 1, wherein the connection piece is symmetrical with relation to a vertical longitudinal center plane and a vertical transverse center plane.

10. A wiper system according to claim 1, wherein the upper connection part has indentations thereon that receive the side walls and back of the link cap in such a manner that a form fitting of the link cap with the connection piece is achieved.

* * * * *